US009243197B2

(12) United States Patent
Hladun et al.

(10) Patent No.: US 9,243,197 B2
(45) Date of Patent: Jan. 26, 2016

(54) RADIANT HEAT FLUX ENHANCED ORGANIC MATERIAL GASIFICATION SYSTEM

(71) Applicant: ENERSOL POWER LLC., Springfield, VA (US)

(72) Inventors: Kenneth Hladun, Penn Valley, PA (US); Jayaraman Ramamurthi, Herndon, VA (US); Mark Edward Vetter, Severna Park, MD (US); Yuji Kado, Fairfax, VA (US)

(73) Assignee: Enersol Power LLC, Springfield, VA (US)

( * ) Notice: Subject to any disclaimer, the term of this patent is extended or adjusted under 35 U.S.C. 154(b) by 343 days.

(21) Appl. No.: 13/871,911

(22) Filed: Apr. 26, 2013

(65) Prior Publication Data

US 2013/0232875 A1 Sep. 12, 2013

Related U.S. Application Data

(62) Division of application No. 12/450,336, filed as application No. PCT/US2009/003019 on May 15, 2009, now Pat. No. 8,430,939.

(60) Provisional application No. 61/127,754, filed on May 15, 2008.

(51) Int. Cl.
*B01J 7/00* (2006.01)
*C10J 3/72* (2006.01)
(Continued)

(52) U.S. Cl.
CPC .. *C10J 3/721* (2013.01); *C10J 3/00* (2013.01); *C10J 3/487* (2013.01); *C10J 3/84* (2013.01);
(Continued)

(58) Field of Classification Search
CPC .................................. C10J 3/487; C10J 3/721
See application file for complete search history.

(56) References Cited

U.S. PATENT DOCUMENTS 3,972,690 A  8/1976 Van Os
3,988,123 A  10/1976 Coates
(Continued)

FOREIGN PATENT DOCUMENTS

EP  0 846 748 A1  6/1998

OTHER PUBLICATIONS

Communication from European Patent Office for corresponding Patent Application No. 09 746 981.1-1361, dated Jun. 10, 2013.
(Continued)

*Primary Examiner* — Imran Akram
(74) *Attorney, Agent, or Firm* — Juan Carlos A. Marquez; Bacon & Thomas PLLC

(57) ABSTRACT

A system for producing superior quality synthesis gas ("syngas") consisting of a series of chambers in which the gasification stages of reaction, homogenization and activation occur. The first stage reaction stage agitates and combines the reactants, consisting primarily of organic matter, oxidizer and steam, to initiate gasification of the organic and volatile fraction and to transport the inorganic residue to continuous removal. In the homogenization chamber, turbulence is induced by injecting gaseous species. The gas mixture emerging from the homogenization chamber is accelerated via a third stage communicating duct and is introduced tangentially into the fourth stage activation chamber inducing a cyclonic motion wherein a high intensity radiant heat source is introduced along the central axis of the gas vortex. The syngas and remaining particulate materials are constrained to exit the activation stage through discrete portals which are oriented to further separate the syngas from the remaining entrained particulates.

7 Claims, 4 Drawing Sheets

(51) Int. Cl.
*C10J 3/00* (2006.01)
*C10J 3/48* (2006.01)
*C10J 3/84* (2006.01)
*C10K 3/00* (2006.01)

(52) U.S. Cl.
CPC ......... *C10K 3/003* (2013.01); *C10J 2300/0916* (2013.01); *C10J 2300/1238* (2013.01); *C10J 2300/1618* (2013.01)

(56) References Cited

U.S. PATENT DOCUMENTS

| | | | | |
|---|---|---|---|---|
| 4,335,664 | A | * | 6/1982 | Lucas et al. .................. 110/346 |
| 4,761,793 | A | | 8/1988 | Digne et al. |
| 4,854,944 | A | | 8/1989 | Strong |
| 4,886,001 | A | | 12/1989 | Chang et al. |
| 5,086,714 | A | | 2/1992 | Hladun |
| 5,138,957 | A | * | 8/1992 | Morey et al. .................. 110/234 |
| 5,280,757 | A | | 1/1994 | Carter et al. |
| 5,336,317 | A | * | 8/1994 | Beisswenger et al. ........ 106/745 |
| 5,960,026 | A | | 9/1999 | Nolting et al. |
| 6,514,469 | B1 | | 2/2003 | Kado et al. |
| 6,551,563 | B1 | | 4/2003 | Kado et al. |
| 6,938,562 | B2 | | 9/2005 | Pope |
| 6,987,792 | B2 | | 1/2006 | Do et al. |
| 7,216,593 | B2 | | 5/2007 | Capote et al. |
| 7,302,897 | B2 | | 12/2007 | Pallett et al. |
| 2003/0000144 | A1 | * | 1/2003 | Maton ...................... 48/197 FM |
| 2004/0009378 | A1 | | 1/2004 | Lightner |
| 2004/0251241 | A1 | | 12/2004 | Blutke et al. |
| 2006/0157899 | A1 | * | 7/2006 | Weaver .......................... 266/197 |
| 2007/0266633 | A1 | | 11/2007 | Tsangaris et al. |
| 2008/0250714 | A1 | * | 10/2008 | Palonen et al. .......... 48/197 FM |
| 2009/0077887 | A1 | | 3/2009 | Michon et al. |
| 2009/0235637 | A1 | | 9/2009 | Foret |

OTHER PUBLICATIONS

J.KL. Merry et al., "Gazéification du charbon avec apport d'énergie électrique", 1o73 Revue Générale de Tharmique 25 (1986), évr., No. 29o, Paris, France, 4 pages and 1 page English abstract.

* cited by examiner

RADIANT HEAT FLUX ENHANCED ORGANIC MATERIAL GASIFICATION SYSTEM

CLAIM OF PRIORITY

The present application is a Divisional of U.S. application Ser. No. 12/450,336, filed Sep. 22, 2009. Priority is claimed based on U.S. application Ser. No. 12/450,336 filed Sep. 22, 2009, which is the U.S. National Stage of PCT Application No. PCT/US2009/003019, filed May 15, 2009, which claims priority from U.S. Provisional Application No. 61/127,754, filed on May 15, 2008, the content of all of which are hereby incorporated by reference into this application.

BACKGROUND OF THE INVENTION (1) Field of the Invention

The field of the invention is the gasification or conversion of organic matter into a gas mixture consisting primarily of carbon monoxide and hydrogen as well as other species. This disclosure relates to a highly flexible, multi-modal method, a system and an apparatus for generating a high quality syngas from the organic content of a wide variety of feedstocks in a gasification chamber incorporating a mechanical hearth, a method and apparatus for the beneficiation of a raw synthesis gas produced in a gasification reactor through homogenization, acceleration, preferential heating, reaction, and the conversion and removal of solids and liquid droplets, and systems incorporating such methods and apparatus.

(2) The Rationale for Gasification

There is growing interest in developing energy from sources other than those derived from petroleum and other fossil fuels. Gasification of the organic fraction of material such as biomass, coal, Municipal Solid Waste (MSW), Regulated Medical Waste (RMW), Construction and Demolition Debris (CDD), agricultural wastes, and various hazardous and non-hazardous industrial and commercial wastes can serve to provide clean, alternative energy. Although this invention is capable of processing any organic bearing material, an important focus is the utilization of waste as a feedstock. Currently, most waste is buried in a landfill, however, it is now well known that this method of disposal is undesirable, since landfills convey the threats of groundwater contamination and uncontrolled emission of greenhouse gases. Furthermore, the disposal of wastes in landfills squanders the opportunity for resource recovery—that is to recycle or reuse the materials, either through the separation of valuable components, or the conversion of the waste into energy or other useful products. In areas with very little available open space, such as densely populated islands, or regions with other geological constraints or impediments, landfills are not feasible options for waste disposal.

Existing Waste-to-Energy (WTE) systems attempt to recover some value from such waste streams through combustion. The waste is burned under excess oxygen conditions, producing primarily carbon dioxide ($CO_2$), water vapor ($H_2O$), and heat. The heat released by the incineration of waste is used to produce steam, or electric energy or a combination thereof. However the combustion based systems for WTE are inefficient, limited as to product type and, require substantially larger and more expensive air pollution control technology to comply with increasingly stringent environmental regulations due to substantially larger volumes of combustion gases when compared to gasification systems.

(3) Overview of Prior Art in the Field of Gasification

Systems operating under controlled sub-stoichiometric oxygen conditions, such as pyrolytic or controlled-oxidant gasification systems (collectively, 'gasifiers', 'gasification systems', or similar terms), offer significant advantages over landfill and combustion technologies for the conversion of wastes to useful products. In such systems, the organic fractions of a wide variety of feedstocks can be converted to a synthesis gas ('syngas') comprised primarily of hydrogen ($H_2$) and carbon monoxide (CO). The syngas, when appropriately cleaned and conditioned, can be used to generate not only steam and electricity at higher efficiency than combustion based WTE systems, but also produce other commodities such as liquid fuels, hydrogen, or industrial chemicals. Gasification processes also offer the opportunity for the separation and sequestration of $CO_2$, the sequestration of $CO_2$ is not economically feasible with combustion-based WTE systems.

Modern gasification systems typically produce far lower pollutant emissions than combustion systems. Gasifiers are designed in variety of configurations, including moving bed, entrained flow, fluidized bed, and grate-based systems. Pyrolytic gasifiers typically do not involve the addition of gaseous reactants, and in non-pyrolytic, controlled-oxidant gasifiers reactants including oxidants such as air, oxygen, water, steam, or combinations thereof are introduced in a variety of ways. Gasifiers may be indirectly or directly heated. A number of gasifier designs have incorporated plasma arc torches as primary or auxiliary sources of heat.

It is generally known to those skilled in the art that gasifier performance and economics are optimized by maximizing the production of desirable species such as $H_2$ and CO, while minimizing the production of fully-oxidized species such as $H_2O$ and $CO_2$. It is also generally known that the performance and economics of downstream syngas utilization systems are optimized by minimizing the concentration of undesirable or unconverted species such as entrained solids, volatile organics, and tars in the syngas stream exiting the gasification system.

Typically, as gasifier temperature increases, organic particulate and gaseous species are more likely to react with injected reactant gases thus diminishing their concentration or virtually eliminating them. However there is a trade off in achieving optimum syngas quality since it is typical to increase gasifier temperature by oxidizing a portion of the valuable $H_2$ and CO. As a result, there is a commensurate reduction of process efficiency. Thus, with the current state of the art the objective of achieving lower levels of undesirable particulate and complex organic species in the syngas involves sacrifice of process efficiency (or yield).

Some have attempted to optimize syngas properties and reduce the levels of undesirable particulate and complex organic species by increasing temperatures through the addition of supplemental heat sources, such as plasma torches, while controlling the availability of oxidants. Two recent examples of such approaches are disclosed in U.S. Patent Application Nos. 2007/0266633 (Tsangaris et al.) and 2009/0077887 (Michon et al.).

Tsangaris discloses a "gas reformulation chamber" incorporating one or more plasma torches and one or more oxygen sources. In this system "the plasma torches heat the chamber and the input gas is thereby converted to reformulated gas" and "the gas reformulating system uses torch heat from a plasma torch to dissociate the gaseous molecules thereby allowing their recombination into smaller molecules . . .". Within this gas reformation chamber, "plasma torch power is adjusted to stabilize the reformulated gas exit temperatures at the design set point. In one embodiment, to ensure that the tars and soot formed in the gasifier are fully decomposed the design set point is about 1000° C."

It is apparent from this description that the Tsangaris design is intended to raise the temperature of the entire syngas stream to achieve the temperatures desired for the conversion of tars and soot (solid particulates).

Michon discloses an elongate reactor containing a plasma torch which generates a plasma plume. Within this reactor, the raw syngas is fed "so that the flow of syngas encounters said plasma jet at least partially so as to mix said syngas and plasma jet". The plasma jet is "seeded with . . . radicals having high chemical reactivity." The radicals react with "the non-advantageous molecules of the syngas to be treated brought up to temperature." The Michon invention further creates a "thermal or thermochemical transformation zone" resulting "from the intimate mixing of the syngas to be treated and of the plasma jet". Thus, the design is intended to directly mix the syngas stream into the plasma plume, in order to bring about gasification reactions between undesirable (and typically dilute) species in the syngas stream with reactive species present in the plasma plume. This intimate mixing is intended to achieve "syngas/plasma jet mixture temperatures that are higher than with prior art apparatus." The apparatus of Michon is equipped with a sensor "for measuring the temperature of the outlet gas in a manner such as to adjust the quality of the outlet gas".

Michon further discloses a "cold wall, low velocity wall" reactor design, wherein the walls of the elongate reactor are protected from temperature and erosive wear by, among other means, "feeding in a protective fluid tangentially to the wall . . . said fluid being at ambient temperature."

It should be noted that the plasma jet envisioned by Michon is volumetrically small relative to the syngas stream "with the plasma jet having a diameter d, the inlet port has a feed orifice for feeding in said syngas whose diameter D is such that D/d is greater than or equal to 10". Those skilled in the art know that, although industrial plasma torches capable of producing large amounts of heat (exceeding 1 MW of power) are available, the plume of a plasma arc torch is of necessity limited in size by the constraints of plasma arc torch design. As a result, the desired intimate mixing between a small plasma arc plume and large volumes of syngas may be difficult to achieve at large commercial scale. Thus, the achievable sizes and capacities of the Michon reactors may be limited by the plasma plume size, and commercial scale gasification systems may require a multitude of Michon reactors. This apparent limitation may result in high capital and operating costs, rendering such systems commercially unviable.

Looking specifically at the aforementioned undesirable species in the syngas, they fall into three general categories: complex organic species in the gaseous phase ("volatile organics"), complex organic species in the liquid particulate phase (e.g., "tars"), and solid particulates (which may contain carbonaceous and/or inorganic materials). As noted above, the rate of conversion of these materials to desirable $H_2$ and CO is affected by the temperature of the reacting species. The rates of reaction are further affected by the availability of oxidants, adequate mixing of the reacting species, reactive particulate surface area (in the case of the particulate species), and sufficient reaction time. Generally, the result of such influences is that the gaseous species react more rapidly than the liquid phase particulates, and the liquid phase particulates react more rapidly than the solid phase particulates, when all such species are at the same temperature.

Prior art systems including those of Tsangaris and Michon envision "bulk heating" systems wherein the desirable syngas components, volatile organics, and particulate species are simultaneously heated to the temperatures required for the conversion of the most problematic of the undesirable species—the solid carbonaceous particulates. While elevating the temperature of the entire syngas stream can promote the conversion of volatile organics and particulates, this approach can also result in the consumption of desirable $H_2$ and CO. Furthermore, this approach can require significant energy input, as large quantities of already-converted gas must be heated to raise the temperature of the typically small concentration of unconverted particulates. An approach which can preferentially elevate the temperature of the more problematic particulate species and thus promote their conversion without significantly heating the bulk of the syngas stream would advantageously require less energy input.

It is therefore desirable, in view of the limitations of existing gasifier technology, to develop a gasification system which can maximize the levels of desirable CO and $H_2$ in syngas and minimize the levels of $CO_2$, $H_2O$, tars, volatile organics, and solids, without requiring excessive energy consumption or excessive numbers of plasma arc torches. None of the prior art discloses such a system. The present invention achieves this optimal design condition, thus representing a significant advancement beyond, and improvement over prior art.

SUMMARY OF THE INVENTION

The present invention is a system which efficiently produces superior quality syngas with the minimum sacrifice of CO and $H_2$. The synthesis gas is first generated in a first stage gasification reactor followed by enhancement of the homogeneity of the synthesis gas in a second stage mixing chamber by the introduction of gaseous species through a nozzle or nozzle array arranged to induce turbulence and partial reformation of volatile hydrocarbon species. The synthesis gas then enters a third stage, where it is accelerated through a narrow passage entering tangentially to the inner boundary wall of a fourth stage cylindrical activation chamber. Tangential introduction of the syngas induces cyclonic flow centered on the long axis of the activation chamber. The plume from a plasma arc torch is introduced at the center of the cyclonic flow and parallel to the long axis of the activation chamber. The plasma plume emits radiant energy in the activation chamber flowing outward from the central axis through the synthesis gas to the high-temperature inner surface of the refractory boundary wall, which absorbs and re-radiates the heat energy. Particulates in the syngas absorb radiant energy emitted from both the walls and the central axis of the chamber. Because of their higher absorption coefficient the particulates in the syngas will gain energy at a much higher rate than the syngas thus preferentially activating the particulates to enter into desirable reactions consuming the organic fraction and liquefying the inorganic residuals.

The syngas is constrained to exit the activator in a manner which necessitates a rapid change of direction. As a result, the remaining particulates will tend to proceed along a trajectory projected from the tangential flow of the vortex while the gas makes its turn toward the exit. The particulates will proceed to be captured by impingement at the refractory boundary. The particulates then fall under the influence of gravity into a collection and removal mechanism.

BRIEF DESCRIPTION OF THE DRAWINGS

The present invention will be described herein below in conjunction with the accompanying drawings illustrating the invention, wherein.

DETAILED DESCRIPTION OF THE PREFERRED EMBODIMENT OF THE INVENTION

Figure 1:
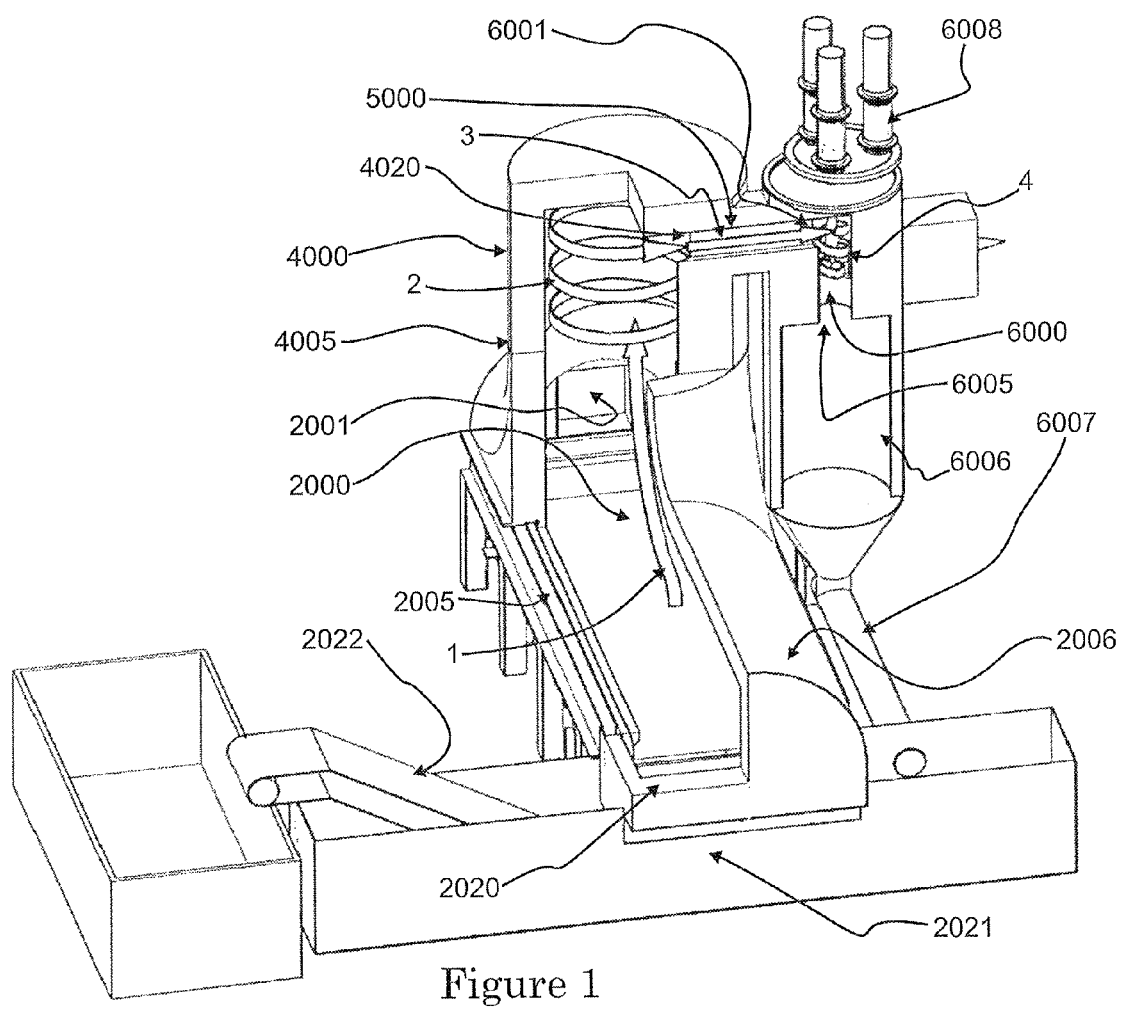
FIG. 1 illustrates a first perspective view with cutaways of a preferred embodiment of the present invention.

Referring to FIGS. 1-4, the organic bearing material is fed into the first stage reaction chamber 2006 through the charge aperture 2001 by means of an auger or multi-stage ram on to a mechanical hearth 2005 where, by controlled vibration, it is agitated and caused to move forward while being mixed with a combination of reactants such as steam, oxygen and air. The organic content of the advancing mass combining with the introduced reactants form a raw syngas 1 made up primarily of CO, $H_2$, $CO_2$, $H_2O$, $N_2$ and others as well as volatile organic compounds and organic and inorganic particulates. The inorganic fraction of the advancing mass proceeds by agitation toward the end of the mechanical hearth 2005 and falls by gravity to an ash collection and removal system 2021/2022 or into an optional vitrification system (not shown) for further processing. By induced draft, the raw syngas 1 created in the first stage reaction chamber 2006 and on the mechanical hearth 2005 rises initially at low velocity to minimize particulate entrainment, and then accelerates toward the second stage homogenization chamber 4000 where fluid species are introduced through an array of one or more nozzles 4005 to induce turbulence and continue the reactions begun in the first stage reaction chamber 2006.

The turbulent and exothermically reacting raw syngas 2 rises through the homogenization chamber 4000 and exits by acceleration through an acceleration duct 5000 wherein increased turbulence causes further completion of the gasification reactions. The reacting syngas 3 then enters the activation chamber 6000 tangentially at the top to form a descending vortex 4 along which a plume of intense radiant energy 6002 is introduced from the top along the long axis of the descending vortex. The radiant energy is transmitted from the central plume 6002 to the hot boundary wall of the activation chamber 6000 which then re-radiates the energy back into the cavity of the activation chamber 6000.

The particulates entrained in the descending syngas vortex 4 preferentially absorb the radiant energy causing a rapid rise in the temperature of the particulates thus accelerating the gasification of the organic fraction and fusion of the inorganic fraction. Because of the vortex motion 4 the fused inorganic particulates migrate to the refractory boundary and are captured upon impingement. They coalesce and run down the wall to the solid/liquid exit portal 6005, from which they drip by gravity into a collection and removal mechanism 6007. The syngas 4 is required to abruptly reverse its direction 5 before exiting the activation chamber 6000 causing a further separation of the remaining particulates (primarily inorganic) which proceed on a separate trajectory to be collected by impingement on the refractory boundary wall of the activation chamber 6000. Substantially all of the remaining particulates exit via the solid/liquid portal 6005, and fall into the collection and removal mechanism 6007. The syngas product 5 will have a minimum of particulate content and not require the rigorous and costly cleanup methods of conventional gasification systems.

Overview of the System

The invention provides a unique system for the gasification of organic or organic-containing feed materials which is further enhanced through the incorporation of a subsystem which converts volatile organic species and organic particulates in the raw syngas stream to primarily $H_2$ and CO, and further removes inorganic particulates from the enhanced syngas product stream.

Figure 2:
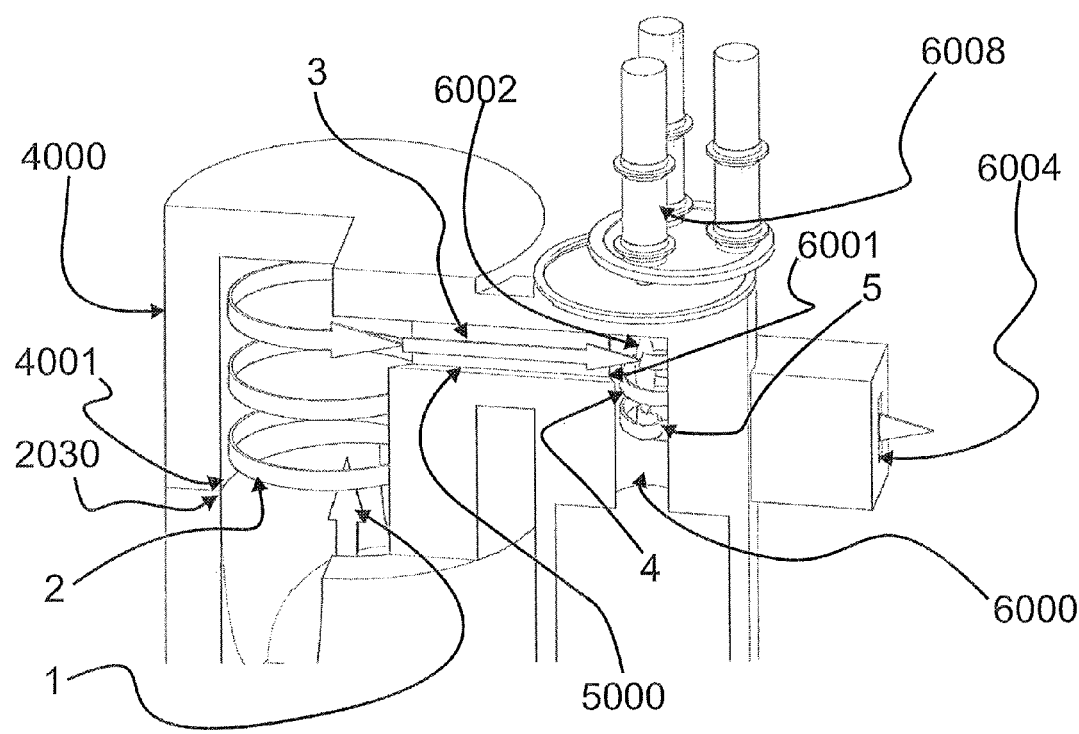
FIG. 2 illustrates a second perspective view with cutaways of the preferred embodiment of the present invention.
Figure 3:
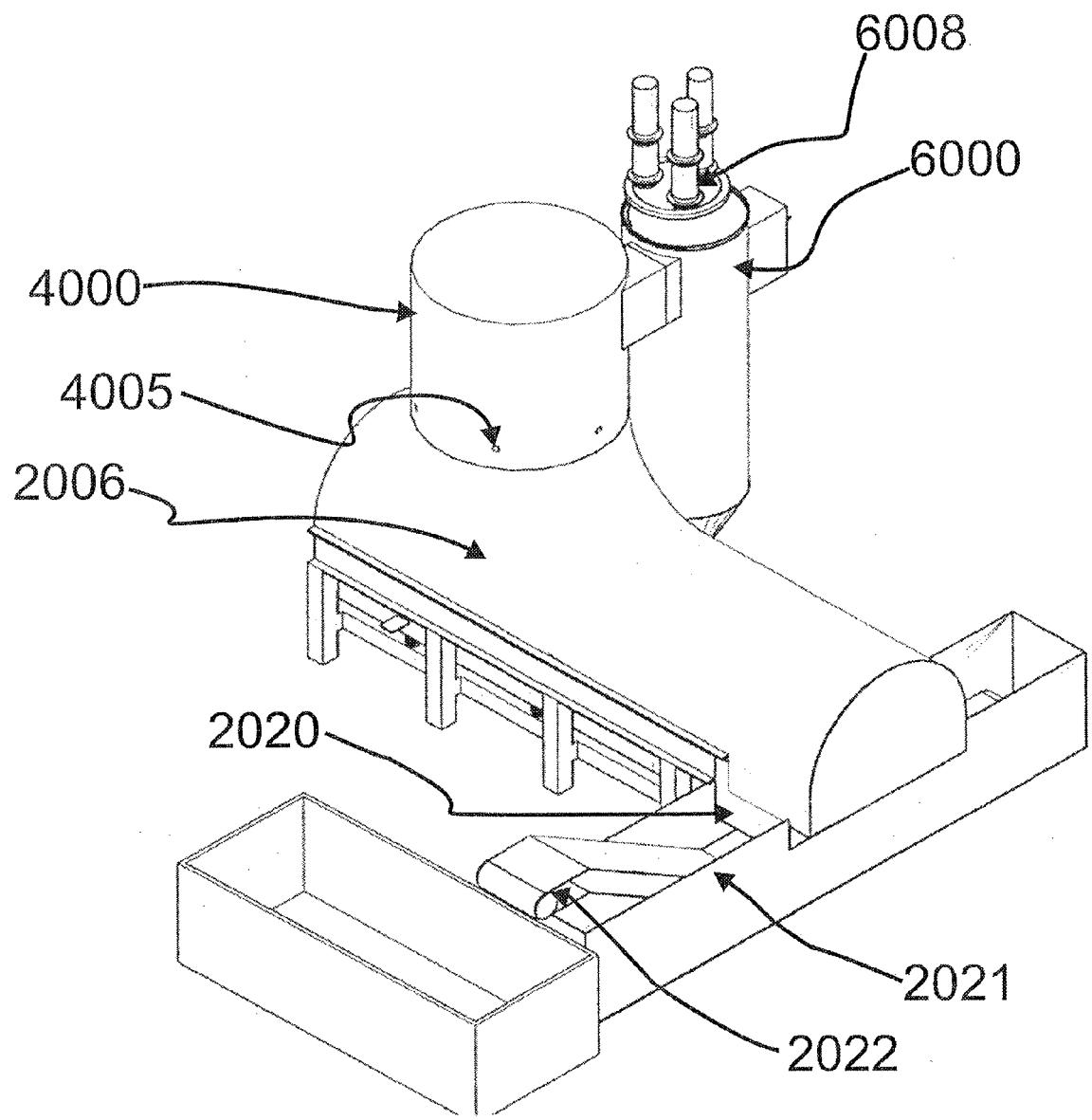
FIG. 3 illustrates a third external perspective view of the preferred embodiment of the present invention.
Figure 4:
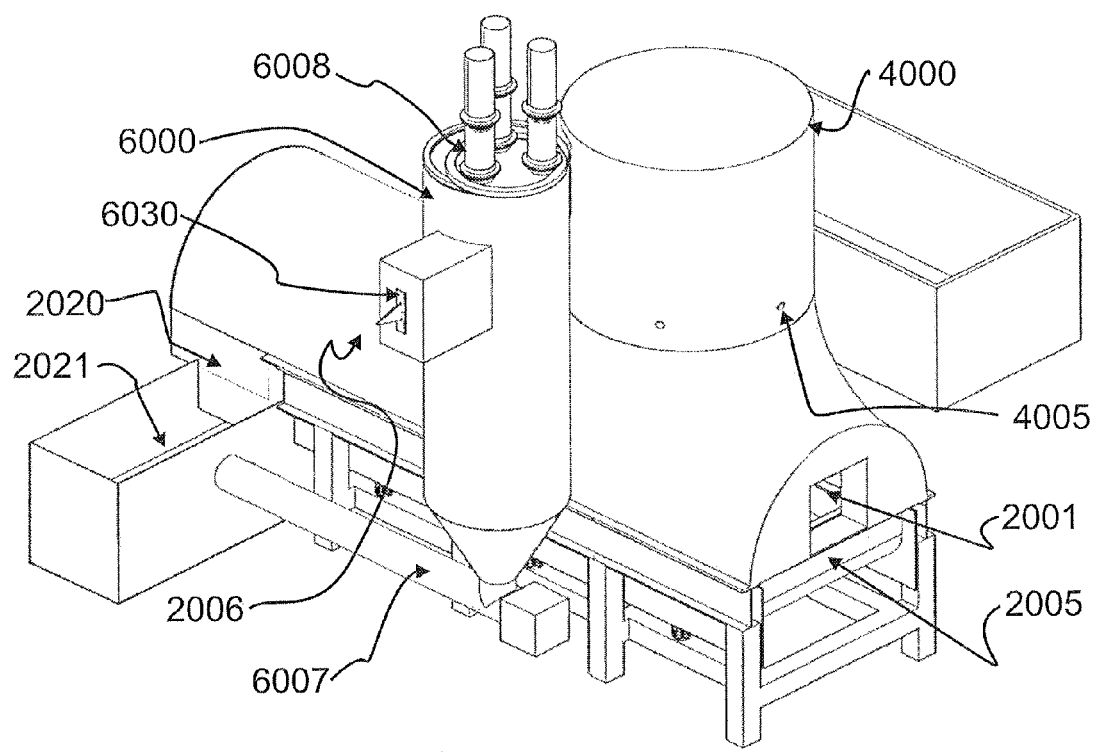
FIG. 4 illustrates a fourth external perspective view of the preferred embodiment of the present invention.

Referring to FIG. 1, the invention provides a gasification system which, in a preferred embodiment, comprises a feed charging mechanism, a first stage gasification reaction chamber 2000 having a charge aperture 2001, a mechanical hearth mechanism 2005 for the agitation and transport of solid materials, one of more gas inlets 2010/2013, mechanisms 2021/2022 for the collection and removal of inorganic residues, and a raw syngas outlet 2030 port. Referring to FIG. 2, the invention further comprises a syngas upgrading unit comprising a second stage gasification/homogenization chamber 4000 having a raw syngas inlet port 4001, and one or more gas addition ports 4005, an acceleration duct 5000 effecting a third stage of gasification, and a fourth stage gasification/activation chamber 6000 which incorporates an intense radiant heat source 6002, a syngas exit port 6004, and a solid/liquid exit port 6005, and a control system.

Feed Charging Mechanism

Organic-bearing feed materials are introduced through one or more feed charging mechanisms which convey the feed materials to the gasifier charge aperture 2001. Since any leakage of air into, or syngas from, a gasification system is undesirable and potentially dangerous, the feed charging mechanism is designed to provide a substantially airtight seal between the ambient environment and the gasification system. For solid feed materials, the feed charging mechanism may comprise a multi-stage ram system, an auger conveyor, or similar device. To maintain an airtight seal, the solid feed mechanism may incorporate features such as airlock gates, inert gas purges, and the like. The solid feed mechanism will typically compress bulk solid feed materials to express and minimize contained air prior to transferring the feed material to the charge aperture 2001. In alternate embodiments of the gasification system, the feed materials may further comprise liquids, sludges, slurries or gases. For such applications, alternate feed handling and injection assemblies comprising equipment such as (but not limited to) pumps, lances or nozzles may be selected for the feed mechanism. Such feed mechanisms are well known to those skilled in the art.

First Stage Gasifier Reactor 2000

A variety of gasifier designs are suitable for use as the first-stage gasification reactor in the method, apparatus, and system contemplated in the current invention. The current invention may incorporate moving bed, fluidized bed, entrained flow, or grate-based first-stage gasification reactors. The current invention may further incorporate directly or indirectly heated first-stage gasification reactors. The current invention may further incorporate pyrolytic or controlled-oxidant first-stage gasification reactors.

In a preferred embodiment of the current invention, illustrated in FIG. 1, the first stage gasification chamber 2000 comprises a charge aperture 2001, a mechanism 2005 for the agitation and transport of solid materials, a reaction chamber 2006, one of more gas inlets 2010/2013, mechanisms 2021/2022 for the collection and removal of inorganic residues, and a crude syngas outlet 2030 port.

Solid feedstock passing through the charge aperture 2001 enters the reactor mechanism 2005. Although this preferred embodiment describes a solid feed material, it should be understood that the feed and reactor mechanisms may be adapted to further accept liquids, sludges, slurries as feedstocks; such feedstocks may be processed individually, in mixtures, or simultaneously through multiple feed mechanisms with the solids herein described. Such adaptations are known to those skilled in the art.

The reactor mechanism 2005, one suitable type of reactor mechanism, is disclosed by Hladun in U.S. Pat. No. 5,086,714, with certain modifications designed to adapt the system for use in a gasification environment. The structure of the mechanical hearth 2005 and its interface with the refractory-lined reaction chamber 2006 are designed to maintain a substantially airtight seal under operating conditions in order to minimize leakage of ambient air into, and syngas from, the gasification system. (Such modifications are the subject of a separate, co-pending patent application.)

Reactant gases, including oxidants such as air, oxygen, and/or steam are introduced individually or in mixtures via multiple plenums 2010 through the mechanical hearth 2005 and into the feedstock mass to initiate and promote gasification reactions. Further gas streams, including but not limited to additional reactants and/or recirculated gases from downstream processes, may be introduced to the gasifier via the plenums 2010 or through one or more gas injection ports 2013 in the reaction chamber 2006. Such gases may be introduced for reasons including but not limited to the enhancement of solids agitation, providing localized heating or cooling, or modifying syngas composition.

As the feedstock mass advances forward, and the injected gases pass through the agitated, fluidized mass, gasification steps including drying, devolatilization and partial oxidation reactions occur, forming a raw syngas 1 consisting of primarily $CO$, $H_2$, $CO_2$, $H_2O$, $N_2$, and other species as well as organic and inorganic particulates. This syngas mixture 1 rises into the first stage gasification reaction chamber 2006, where the reformation reactions continue.

The inorganic fraction of the feed material remains substantially in the solid state ("ash") and progresses toward the end of the mechanical hearth 2005 under the influence of the mechanical motion. The inorganic solids fall by gravity over the end of the hearth 2005, through an ash drop chute 2020 into an ash collection mechanism 2021. The ash collection mechanism 2021 is designed and constructed as a sealed assembly to prevent the ingress of ambient air, and the egress of syngas. Such sealing mechanism may incorporate a water bath, rotary airlock, or similar air lock assembly.

In one embodiment of the invention, an ash removal mechanism 2022 conveys the ash to an external container for disposal. In an alternate embodiment, the collected ash 2021 is melted (either in-situ or ex-situ) in a vitrification subsystem (not shown) to produce a non-leaching vitrified slag prior to disposal. Such ash vitrification systems are known to those skilled in the art.

By induced draft, the raw syngas mixture 1 in the reaction chamber 2006 moves toward the raw syngas outlet port 2030 and the homogenization chamber 4000. The volume of reaction chamber 2006 is designed to provide an adequate residence time for the formation of the raw syngas 1. The volume of the reaction chamber 2006, and further the cross-sectional area of reaction chamber 2006 and the raw syngas outlet port 2030 are designed to maintain a low upward velocity in the raw syngas stream 1, such velocity being selected to minimize the entrainment of particulate species in the raw syngas 1.

The reaction chamber 2006 may be of any shape which satisfies the requirements of residence time and gas exit velocity. In one embodiment, the reaction chamber 2006 comprises vertical walls approximately aligning with the borders of the mechanical hearth 2005, with a domed or arched roof. The exit portal 2030 is oriented at the peak of the roof, aligned toward the feed inlet end of the hearth.

Second Stage Gasification/Homogenization Chamber 4000

Referring to FIG. 2, raw syngas 1 from the first stage gasification reaction chamber 2000 enters the second stage gasification/homogenization chamber 4000 via a raw syngas inlet port 4001 which is in fluid communication with the gasifier raw syngas outlet port 2030. In one embodiment, the two chambers may be directly coupled via mounting flanges. In an alternate embodiment, the vessels may be separated by a duct, piping, or conduit. In an additional embodiment, one homogenization chamber 4000 may be coupled to a plurality of first stage gasifier units.

The homogenization chamber 4000 further comprises one or more gas addition ports 4005. These ports 4005 provide means for the injection of additional gases, including oxidizing reactants such as air, oxygen, or steam, or for other gases, either singly or in combined mixtures, intended to enhance turbulence or gas composition. The gas addition ports 4005 are typically located near the gas inlet port 4001 in order to promote gas mixing within the volume of the gas homogenization chamber 4000.

The homogenization chamber 4000 further comprises a syngas outlet port 4020 which is in fluid communication with an acceleration duct 5000.

The volume of homogenization chamber 4000 is designed with adequate volume to provide the residence time necessary to promote exothermic reaction of volatile organic species in the gaseous phase with injected reactants, such residence time and reactant gas concentration selected to enhance the concentrations of $CO$ and $H_2$, and minimize production of $CO_2$ and $H_2O$.

In alternate embodiments of the system, the homogenization chamber 4000 may be coupled to and utilized in conjunction with various types of first-stage gasifiers. In general, lower-temperature gasifier reactors will produce raw syngas 1 containing higher levels of complex organic species. For these applications, the homogenization chamber 4000 volume, residence time, and reactant gas injection levels will be increased to ensure completion of the desired reactions in the homogenization chamber 4000. For applications where the homogenization chamber 4000 is coupled to higher temperature gasifiers, the concentration of complex organic species in the raw syngas 1 will typically be lower. In these embodiments, the homogenization chamber 4000, residence time, and reactant gas injection levels will be comparatively smaller.

The homogenization chamber 4000 is designed to retain the heat contained in the raw syngas 1, and heat generated by exothermic reactions occurring in the chamber. Heat is not added to the homogenization chamber 4000 via plasma torches or other means.

The homogenization chamber 4000 is designed to enhance turbulent flow and vigorous mixing 2 of the raw syngas 1 with the gases injected via ports 4005. To generate such turbulence, the gas addition ports 4005 may be oriented to inject gases substantially tangentially to the chamber walls with the intent of inducing a cyclonic flow 2. In an alternate embodiment, the gas addition ports 4005 may be equipped with high-velocity nozzles oriented to maximize gas turbulence. In an alternate embodiment, the homogenization chamber 4000 may be equipped with internal baffles or other structures intended to disrupt or redirect the gas flows in a manner consistent with improved turbulence, gas mixing, and/or residence time.

The homogenization chamber 4000 may be of any shape, and may be positioned in any orientation so long as the desired residence time and turbulence are maintained.

In one preferred embodiment, the homogenization chamber 4000 is cylindrically shaped and vertically oriented. The raw syngas inlet port 4001 is located at the base of the cylinder, and the syngas outlet 4020 is located tangential to the wall of the cylindrical vessel near the top of the cylinder. The gas addition ports 4005 are located on the side wall of the cylinder, near the raw syngas inlet port 4001.

Third Stage Gasification/Acceleration Duct 5000

The acceleration duct 5000 provides a syngas communication pathway between the homogenization chamber syngas outlet 4020 and the activator chamber 6000. Within the acceleration duct 5000, the syngas 3 velocity and turbulence increases significantly from that in the homogenization chamber 4000. The resultant gas mixing promotes rapid reactions between any remaining reactive species in the syngas.

Further, the high velocity and turbulence region 3 within the acceleration duct 5000 attrits and separates agglomerated particulate species, thus exposing additional surface area and potential reaction sites. Such surfaces and sites, having been previously internal to larger particulate masses, may not yet have achieved a high enough temperature or adequate contact with reactant gas species to participate in the desired gasification reactions.

The composition of the syngas 3 exiting the acceleration duct 5000 is substantially improved relative to the raw syngas 1 entering the homogenization chamber 4000. Substantially all of the complex organic species are eliminated, having been converted to more desirable compounds. The concentration of organic particulates has been reduced, but significant amounts of organic and inorganic particulates may remain entrained in the syngas 3 at the exit of acceleration duct 5000.

Fourth Stage Gasification/Activator 6000

Referring to FIG. 2, syngas 3 from the acceleration duct 5000 enters the roughly cylindrical activator chamber 6000 through tangential inlet port 6001. The tangential entry induces a cyclonic flow in the gas stream 4 which is centered along the long axis of the activator chamber 6000. A high intensity radiant heat source 6002 is oriented substantially along and in alignment with the long central axis of the activator chamber vessel 6000, and is typically located roughly in line with the syngas inlet 6001. Centrifugal force causes particulates in the syngas 4 to move toward, and impact upon, the hot refractory-lined walls of the chamber 6000. Radiant heat emanating outward from the centerline of the vessel passes through the syngas 4 toward the particulates and refractory walls. Due to the flow patterns in the activator 6000 and the particulate movement toward the vessel walls, the syngas residence time is shorter than the particulates residence time.

The particulates have a significantly higher absorption coefficient than the entraining gas 4, and consequently preferentially absorb the radiant energy and increase in temperature at a much higher rate than the syngas 4. Organic particulates react more quickly with reactants at elevated temperatures, forming additional syngas. Inorganic particulates are similarly heated, raising the temperature of many particles to the fusion point. The activator chamber 6000 further comprises a syngas exit port 6004 and a solid/liquid exit port 6005. The activator chamber 6000 construction, exit port 6004/6005 locations, and cyclonic gas flow pattern effect the separation of syngas from residual particulates and fused inorganic material.

The activator 6000 is arranged with tangential inlet port 6001 on the cylinder side wall near the top, and the long axis of the cylinder oriented substantially vertical. This inlet port 6001 guides syngas from the acceleration duct 5000 into the activator chamber 6000. In one preferred embodiment of the invention, the inlet port 6001 is located upstream of (nearer to the top of the chamber than) the radiant heat source 6002. In this arrangement, the syngas flow develops in the cyclonic pattern 4 and the particulates move toward the vessel refractory wall prior to passing through the region of maximum radiant heat flux. In an alternate preferred embodiment, the inlet port 6001 is oriented substantially in alignment with the radiant heat source 6002.

The high intensity radiant heat source 6002 is oriented substantially along the vertical long axis of the cylindrical activator 6000. The radiant heat source 6002 is specifically oriented such that the region of maximum heat flux from the source impinging upon the inner refractory wall of the activator vessel 6000 substantially coincides with the region of where the particulates entrained in the syngas become concentrated in the vicinity of the refractory wall under the influence of centrifugal forces induced by the cyclonic flow pattern of the syngas 4.

Radiant heat emanating from the source 6002 passes through the gaseous components of the syngas 4 with minimal heat transfer, due to the low absorption coefficients of the gaseous species. Particulates in the syngas 4 exhibit higher absorption coefficients, and preferentially absorb radiant energy emanating from the source as it directly impinges upon the particulate surfaces. Radiant energy which is not absorbed by the gaseous species or particulates impinges upon the inner refractory wall of the activator 6000, whereupon the radiant energy is either absorbed or reflected back into the vessel. Radiant energy which is reflected by or re-radiated from the refractory wall again passes substantially unabsorbed through the gaseous species, and is preferentially absorbed by the particulates.

Of the energy which is absorbed by the refractory wall, a significant portion is re-radiated back into the vessel 6000. Additional heat may be transferred via conduction to particulates impinging upon the inner surface of the refractory wall. A smaller portion is conducted through the wall of the activator vessel 6000 and is lost to the ambient environment. A still smaller portion is transferred via conduction to the syngas 4.

The current invention is scalable over a wide range of capacities. Unlike inventions which rely on mixing gases within the limited volume of a small plasma plume, the current invention makes use of the radiant energy produced by a plasma torch 6002, which is emitted, reflected, and re-radiated throughout the volume of the activator vessel 6000.

The current invention thus provides a means to preferentially transfer heat energy to the particulate species, with substantially minimal heating of the gaseous portion of the syngas stream.

The current invention envisions a high velocity, 'hot wall' refractory system within the activator 6000. The syngas, particulates, and radiant energy are all directed at high velocity toward and along the refractory wall with the intention of preferential heating of the particulates via primarily radiant heating means. The current invention envisions a refractory wall, the hot face of which will be heated to near or above the softening (fusion) temperature of the refractory material. Particulates impinging upon this hot, soft wall may temporarily adhere to such surface, providing extended residence time for the particulates to absorb additional heat energy via radiation and direct conduction. The organic fraction of such particulates will be encouraged to participate in gasification reactions by elevated particle temperatures and intimate contact with reactive species in the highly turbulent syngas stream. The inorganic fraction of such particulates will experience similar elevated temperatures, which will result in fusion of a portion of the solid inorganic materials. Such molten materials will move down the refractory wall under the influence of gravity, effecting separation of the inorganic residues from the syngas stream.

The current invention requires specific refractory materials which can tolerate the high velocity, 'hot wall' conditions of the activator environment for a period of time (service life) which is long enough to allow economical operation of the system. Inferior refractory materials will melt or erode away rapidly, leading to premature failure of the refractory system and excessive downtime for refractory maintenance and replacement. By the selection of appropriate refractory materials, which are known to those skilled in the art, adequate service life can be achieved which will permit economical operation of the high velocity, hot wall activator system.

A variety of device types may be used as the radiant heat source 6002. Typically, the radiant heat source 6002 will comprise a thermal plasma generating device. In a preferred embodiment of the invention, the source is a plasma arc torch. In further embodiments, the source may be a DC or AC plasma arc torch. In a further preferred embodiment, the source is a non-transferred plasma arc torch. In further preferred embodiments, the non-transferred arc plasma torch may be of reverse polarity or straight polarity design. In alternate embodiments, the plasma generating device may be a transferred arc plasma torch or a graphite electrode plasma device.

A plasma arc torch 6002 requires the injection of a torch gas which is partially ionized to produce a high intensity plasma plume. The torch gas may be selected from gases or gas mixtures which include, but are not limited to air, $N_2$, $O_2$, $CH_4$, syngas, $H_2$, CO, $CO_2$, He, and Ar. Those skilled in the art can indentify plasma torches and torch gases appropriate for service in the activator 6000.

With the exception of the plasma torch gas, the current invention utilizes no gas addition into the activator chamber.

The high intensity radiant heat source 6002, typically a plasma arc torch, penetrates the roof of the activator chamber 6000. In order to prevent the ingress of ambient air and the egress of syngas, the mounting structure 6008 must provide a substantially airtight seal. To minimize process downtime associated with periodic maintenance on the plasma torch, it is desirable to provide the capability to rapidly remove and replace the plasma torch 6002. The current invention envisions the mounting of a plurality of plasma torches in an apparatus 6008 which maintains an air tight seal while further providing for rapid plasma torch extraction, interchange, and replacement.

In a preferred embodiment of the invention, the torch mounting apparatus 6008 is equipped for two plasma torches, where one torch is in operation and another torch in available on standby. In an alternate embodiment, the number of plasma torches is three or more.

The refined syngas exit port 6004 is oriented to require a rapid change is gas flow direction 5, which encourages the separation of entrained particulates from the syngas stream. In a preferred embodiment, the syngas exit port 6004 is located near the bottom of the cylindrical activator chamber 6000, oriented such that the gas flow direction 5 is substantially in the opposite direction of the cyclonic gas flow pattern 4 inside the activator 6000. The refined syngas 5 passes through the syngas exit portal 6004 into a syngas product conduit 6030. Particulates, having higher momentum than the gaseous species, will continue moving in the direction induced by the cyclonic flow 4 and will thus separate from the exiting syngas stream 5. The particulates will continue toward the solid/liquid exit port 6005, either through the gas stream or by impaction with the refractory wall of the chamber.

In an alternate embodiment of the activator, the syngas exit port 6004 is located on the top of the activator chamber 6000, co-axial with the long axis of the cylinder and the radiant heat source 6002. In this embodiment, the radiant heat source 6002 would penetrate through the syngas exit portal 6004 and the syngas product conduit 6030.

The solid/liquid exit port 6005 is located at the bottom of the activator vessel 6000. In one preferred embodiment, the bottom of the cylinder 6000 may be roughly conical in shape, tapering to the exit port 6005. From this port 6005, the solid and liquid materials drop under the effect of gravity through a vertical drop chute or conduit 6006 to a collection and removal mechanism 6007.

As the solid and liquid materials fall through the drop chute 6006, they may tend to cool and agglomerate. If the materials adhere to the inner wall of the drop chute 6006, plugging of the chute may eventually occur. It is therefore desirable to minimize the accumulation of material upon the inner wall of the drop chute 6006. To minimize cooling, the drop chute 6006 may be lined with insulating refractory materials to reduce heat losses. The drop chute 6006 may also be configured such that the liquid materials will tend to drip from the exit port 6005 and free-fall through the drop chute 6006, rather than run down along the inner wall and solidify upon it. In one embodiment, the internal diameter of drop chute 6006 exceeds the internal diameter of exit port 6005. In a further embodiment, the internal diameter of the drop chute 6006 may remain substantially constant along its length. In an alternate embodiment, the internal diameter of drop chute 6006 may gradually increase as the distance from exit port 6005 increases.

The removal mechanism 6007 incorporates a substantially airtight seal to prevent the ingress of ambient air and the egress of syngas. In one embodiment, the drop chute 6006 may extend beneath the liquid level in a water bath (not shown), which provides the sealing mechanism. In an alternate embodiment, the drop chute 6006 may connect to the roof of a substantially sealed chamber which contains a quantity of water (not shown). The removal mechanism 6007 extracts the cooled and solidified residues for disposal. In one embodiment of the system, the removal mechanism 6007 may comprise a screw conveyor. In an alternate embodiment, the removal mechanism 6007 may comprise a dredge conveyor (not shown).

Vessel Design and Construction

The first stage gasification reaction chamber 2000, homogenization chamber 4000, acceleration duct 5000, and activator 6000 are sealed vessels having internal volumes defined by walls. The walls are of steel construction, the inside surfaces of which are lined with refractory materials selected to retain heat and temperature within the chamber, and further to protect the steel shell from temperature extremes and corrosive constituents in the raw syngas. The walls are further designed to withstand a range of vacuum and/or pressure as specified for the application.

The selection and design of the refractory materials may vary between regions within the system. As the syngas (1, 2, 3, 4, 5) flows through the individual subsystems, the conditions experienced by the refractory materials vary, with the syngas temperature, turbulence, and velocity generally increasing from the first stage 2000 through the fourth stage 6000. Consequently, refractory materials possessing higher temperature and wall velocity tolerances are selected for areas such as, for example, the acceleration duct 5000 relative to the first stage reaction chamber 2006. As noted above, the selection of refractory materials for the activator 6000 entails additional concerns.

The design, specification, and selection of such suitable metal walls and refractory materials are known to those skilled in the art.

The design and fabrication of the system components incorporates typical portals for gas injection nozzles, inspection, viewports, product sampling, instruments and sensors. The design and fabrication of the system components further incorporates typical features which aid in the fabrication, assembly, disassembly, and maintenance of the system. For example, manways for maintenance access and flanged connections for ease of system disassembly and maintenance are typical features of such systems.

Operating Conditions

The current invention may process a wide variety of feedstocks, and incorporate a variety of first-stage gasification reactor 2000 subsystems. Accordingly, the operating conditions may vary significantly. A first stage gasification reactor 2000 processing a biomass material may comprise an indirectly heated grate-based unit operating under conditions of, for example, a slight vacuum of 5" water column and at a relatively low temperature of approximately 800° F., and producing a raw syngas containing a significant concentration of volatile organic species and a small quantity of entrained particulates. Alternatively, a first stage gasification reactor 2000 processing a hazardous waste slurry may comprise an oxygen-fed, plasma assisted entrained flow reactor, operating at, for example, a pressure of 800 psig and a temperature of up to 3,000° F. and producing a raw syngas containing a relatively smaller concentration of volatile organic species, but a relatively larger quantity of entrained particulates. These examples are provided to illustrate the range of possible operating conditions for the first stage gasification reactor 2000, and thus the ranges of temperatures, pressure, and composition of the raw syngas entering the homogenization chamber 4000, and not to define specific system selections or operating conditions.

The first-stage reaction chamber 2006, homogenization chamber 4000, and activator 6000 are designed to provide adequate gas residence times for the specified degree of completion of the chemical reactions occurring within each section. The vessel volumes and syngas flow patterns are therefore designed to provide the specified residence times. Typical engineering methods, including computational fluid dynamics (CFD) modeling may be used to ensure that the desired residence times are achieved. Depending upon the feedstock and the type of reactor selected for the first-stage gasification reactor 2000, the residence time in reaction chamber 2006 may be specified, for example, to be between 0.25 seconds and 10 seconds. Depending properties of the raw syngas exiting the first stage gasifier 2000, the specified residence time for the homogenization chamber 4000 may vary, for example, over a range of typically 1 second to 5 seconds. The specified gas residence time in the activator 6000 will be shorter, typically less than 1 second.

Control Systems

The control of this gasification process can be carried out using fundamental pressure, temperature, composition analysis and other traditional sensing devices with human interaction to regulate valves, potentiometers and other standard items or by digital control systems using state of the art digital sensors providing input to a central processing unit employing algorithms to produce the necessary electronic outputs to actuators and other devices to regulate the process.

In the preferred embodiment of this invention, the gasification system will incorporate full digital control and monitoring with the capability for manual overrides in case of contingency situations. The digital control aspect of the preferred embodiment will utilize standard commercial hardware and software systems for the regulation of the gasification process.

Typical process measurements may include syngas and refractory wall temperatures, pressures and syngas composition at multiple points within the first stage gasifier 2000, homogenization chamber 4000, acceleration duct 5000, activator 6000, syngas product conduit 6030, and in further downstream syngas processing systems. Temperatures may be measured using typical industrial thermocouples, pyrometers, and the like. Syngas composition may be measured by devices such as gas analyzers (including infrared, paramagnetic, thermal conductivity, and/or mass spectrometry analyzers, and similar devices). The concentration of particulates in the syngas may be measured using various types of opacity and triboelectric analyzers, and similar devices.

Typical control variables may include the amount, type, and location of gas addition, plasma torch power input, and the speed of an induced draft fan or position of a pressure control valve.

In a typical embodiment of a control scheme for the current invention may be described as follows: The syngas pressure is measured in the first stage gasifier 2000, and the speed of an induced draft fan (not shown) is varied to control the system pressure. The syngas temperature at the exits of the first stage gasification reaction chamber 2006 and homogenization chamber 4000 are measured, and the flows of gases injected to the respective chambers are adjusted to regulate the temperature at specified setpoints. The concentration of particulates in the syngas product conduit is measured, and the plasma torch power level is adjusted to maintain the concentration within a specified range.

Suitable measurement devices, control devices, control systems and control schemes are well known to those skilled in the art.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

We claim:

1. A multistage gasification system, comprising:
   a first stage gasification reactor for generating a first stage synthesis gas;
   a second stage mixing chamber configured to enhance homogeneity of the first stage synthesis gas;
   a third stage accelerator passage for receiving and accelerating the homogenized synthesis gas;
   a fourth stage activation chamber configured to tangentially receive the accelerated synthesis gas so as to induce cyclonic flow of the accelerated synthesis gas in the activation chamber; and
   a radiant energy source positioned in the activation chamber for introducing radiant energy into the cyclonic flow of the accelerated synthesis gas so as to preferentially heat particulates in the accelerated synthesis gas, wherein
   the radiant energy source is operatively positioned in the middle of the cyclonic flow such that radiant energy from the radiant energy source is re-radiated back from outer walls of the first stage of the chamber to heat the particulates, the activation chamber is further configured such that the accelerated synthetic gas orbits the radiant heat source in a cyclonic flow pattern so as to maximize energy absorption by the particulates, and the outer walls of the first stage are formed so as to soften when heated allowing the particulates to adhere to an inner surface of the outer walls in the first stage and thereby separate from the accelerated synthesis gas.

2. A multistage gasification system according to claim 1, wherein the first stage gasification reactor includes a vibratory hearth for combining organic matter and reactants.

3. A multistage gasification system according to claim 1, wherein the mixing chamber is configured to introduce a gaseous species into the first stage synthesis gas for inducing turbulence and reforming volatile hydrocarbon species in the first stage synthesis gas.

4. A multistage gasification system according to claim 1, wherein the third stage accelerator passage is formed as a narrow passage connected to tangentially introduce the accelerated synthesis gas through to an inner boundary wall of the fourth stage activation chamber and to promote further gasification through the attrition and separation of agglomerated particulates.

5. A multistage gasification system according to claim 1, wherein the fourth stage activation chamber is cylindrically-shaped and formed with a refractory boundary wall and in which internally entrained particulates simultaneously absorb energy from a radiant source and secondarily from the hot refractory boundary wall.

6. A multistage gasification system according to claim 1, wherein the fourth stage activation chamber is cylindrically-shaped to induce cyclonic flow of the accelerated synthesis gas in a first direction according to tangentially entry of the accelerated synthesis gas into the activation chamber, and the activation chamber includes an exit port formed in a second direction in reverse to the first direction.

7. An apparatus for multistage gasification of organic or organic-containing feed material, comprising:

an infeed mechanism for infeeding heterogenous solid material to a primary chamber so as to generate a first stage synthesis gas to be processed;

a primary chamber configured to receive the first stage synthesis gas from the infeed mechanism, the primary chamber including a hearth mechanism configured to continuously mix, agitate and convey reacting species and extracting inorganic fraction of the heterogenous solid material, the infeed mechanism and the primary chamber being configured to prevent leakage of external air to an interior thereof or escape of synthesis gas therein to outside surroundings of the apparatus;

a secondary chamber configured to receive the synthesis gas and to introduce a gaseous species into the synthesis gas in order to induce turbulent mixing and accelerated reaction and thereby generate a reacting gaseous mixture;

a communication duct through which the reacting gaseous mixture is accelerated to create turbulence; and a cylindrical chamber configured to constrain the reacting gaseous mixture in a downward cyclonic flow, the cylindrical chamber having a high flux radiant energy source positioned along a central longitudinal axis thereof so as to preferentially heat particulates in the reacting gaseous mixture, wherein the radiant energy source is operatively positioned in the middle of the cyclonic flow such that radiant energy from the radiant energy source is re-radiated back from outer walls of the cylindrical chamber to heat the particulates, the cylindrical chamber is further configured such that the accelerated synthetic gas orbits the radiant heat source in a cyclonic flow pattern so as to maximize energy absorption by the particulates, the outer walls of the primary chamber are formed so as to soften when heated allowing the particulates to adhere to an inner surface of the outer walls in the first stage and thereby separate from the accelerated synthesis gas, and the cylindrical chamber is further configured to constrain the reacting gaseous mixture into a reverse flow direction prior to exiting.

* * * * *